United States Patent Office 3,623,874
Patented Nov. 30, 1971

3,623,874
PHOTOGRAPHIC LIGHT-SENSITIVE SILVER HALIDE MATERIAL CONTAINING DISAZO DYES
Alfred Froehlich, Marly-le-Grand, Switzerland, assignor to Ciba Limited, Basel, Switzerland
No Drawing. Filed Apr. 2, 1969, Ser. No. 812,866
Claims priority, application Switzerland, Apr. 8, 1968, 5,167/68
Int. Cl. G03c 1/10
U.S. Cl. 96—73                    10 Claims

ABSTRACT OF THE DISCLOSURE

Photographic material for the silver dye bleaching process containing cyan dyestuffs of this constitution: [1,8-aminohydroxy- or 1,8-dihydroxy-naphthalene-mono- or disulfonic acid radical]—N=N-p-benzene radical—N=N—[radical of a 2-hydroxy-3-naphthoic acid arylamide containing at least one water solubilizing group in the aryl radical]. These dyestuffs have a very low absorption in the blue and green spectral regions, are fast to diffusion, are well soluble, are stable towards cations, are fast to light and are easy to bleach.

---

The present invention provides photographic light-sensitive material for the silver dye bleaching process, which comprises on a support at least one layer containing at least one disazo dye of the formula (1)   $R_1$—N=N—$R_2$—N=N— 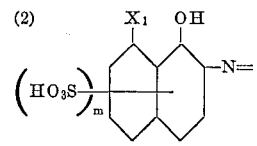

in which $R_1$ represents a napthalene residue linked in 7-position with the azo bridge and which contains a hydroxyl group in 8-position, a hydroxyl group in 1-position which may be etherified or an amino group which may be substituted by alkyl, cycloalkyl, aralkyl, aryl or acyl groups, or a halogen atom and in addition one or two sulphonic acid groups; $R_2$ represents a benzene residue linked with the azo bridge in the 1,4-position; $R_3$ represents an aromatic residue containing at least one acidic group imparting solubility in water, and U represents the complement to a naphthalene, anthracene, fluorene, carbazole or diphenylene oxide residue.

Accordingly, these dyes contain for instance a residue of the formula (1.1)  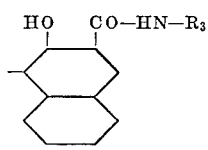

or (1.2)  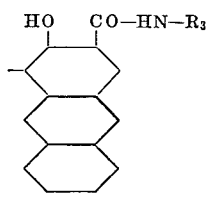

the naphthalene compounds (1.1) being preferred. The residues of the given formulae may contain further substituents, for example methyl groups, chlorine atoms or methoxy groups.

Among the dyes that contain the residue of a 2-hydroxy-naphthalene-3-carboxylic acid arylamide (1.1) those of the formula (2)  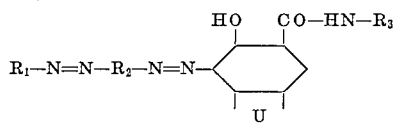
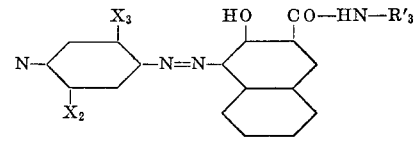

should be specially mentioned. In this formula $m=1$ or 2 so that the disazo dyes may contain a sulphonic acid group in the naphthalene residue linked to the azo bridge in 7-position, for example in 5-position, or two such groups, for example in the 3,5-, 4,6- or especially in the 3,6-position. The 2,4-position is specially concerned when $X_1$ is an $H_2N$-group.

Otherwise, there are three possibilities for $X_1$: First, $X_1$ may be a free hydroxyl group or a hydroxyl group etherified by lower (i.e. $C_1$–$C_4$) alkyl, hydroxyalkyl or alkoxyalkyl groups for example methyl, ethyl, n-butyl, β-hydroxyethyl, β-methoxy-ethyl or by aralkyl residues for example benzyl, or by phenyl groups; secondly, $X_1$ may represent a free or functionally modified amino group (thus, as mentioned above an $H_2N$-group) or an amino group substituted by alkyl groups for example methyl or butyl, or by cycloalkyl residues for example cyclohexyl, or aralkyl residues for example benzyl, by aryl residues for example phenyl, ortho- or para-methylphenyl or especially by acyl residues. The latter may be derived from various monocarboxylic or monosulphonic acids, for example from fatty acids for example acetic acid, caprylic acid, or lauric acid, from cycloaliphatic carboxylic acids for example cyclohexane carboxylic acid, from heterocyclic carboxylic acids for example pyridine carboxylic acids, furan-2-carboxylic acid or thiophene-2-carboxylic acid, from aromatic carboxylic acids, preferably those of the benzene series for example benzene carboxylic acid itself, methylbenzene carboxylic acids, acetylaminobenzene carboxylic acids, dichlorobenzene carboxylic acids, trifluoromethylbenzene carboxylic acids, and finally from aromatic sulphonic acids for example benzene sulphonic acid, methylbenzene sulphonic acids, halobenzene sulphonic acids and trifluoromethylbenzene sulphonic acids.

Whereas dyes of the Formula 1 may contain substituents in any desired positions in the residue $R_2$, these substituents ($X_2$, $X_3$), if present at all, must be in dyes of the Formula 2 in the prescribed positions. Suitable substituents are lower alkyl groups for example methyl or ethyl, halogen atoms for example chlorine, alkoxy groups for example methoxy or ethoxy, hydroxyalkoxy groups for example β-hydroxyethoxy, and acylamino groups for example acetylamino or benzoylamino.

The residue $R'_3$ is an aromatic residue consisting of at most three 6-membered rings which contains at least one acidic group imparting solubility in water. When the residue $R'_3$ contains two or three rings, these rings may be linked directly or through a bridge member, for example an oxygen or sulphur atom in the para-position to the —HN— group or they may be condensed so that this cyclic system contains, for example, a naphthalene residue, or a naphthalene and benzene residue, or two benzene residues or only one benzene residue. Naphthalene residues may be linked with the —HN— group in 1- or 2-position. Suitable acidic groups imparting solubility in water in the first place are carboxylic or sulphonic acid groups. The residue $R'_3$ advantageously contains one or two acidic groups imparting solubility in water. It goes without saying that the aromatic residues $R'_3$ may also contain substituents, for example a nitro group, or those mentioned above for $X_2$ and $X_3$.

As has been described above in detail, the disazo dyes of the formula (3) 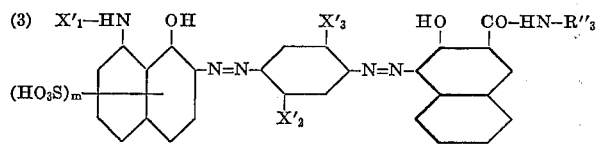

are preferred; in this formula $X'_1$ represents the acyl residue of an aliphatic, cycloaliphatic, aromatic or heterocyclic carboxylic or of an aromatic sulphonic acid; $X'_2$ and $X'_3$ each represents an alkoxy group containing at most two carbon atoms, preferably a methoxy group; $R''_3$ repersents an aromatic residue consisting of at most two 6-membered rings and containing at least one sulphonic or carboxylic acid group, and $m=1$ or 2.

In this connection the dyes of the formula (4) 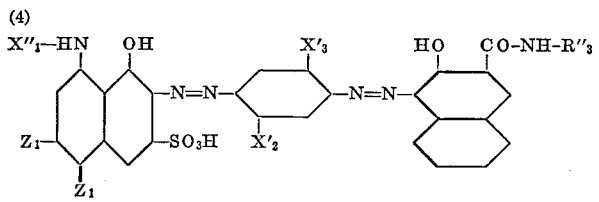

should be specially mentioned; in this formula $X''_1$ represents a benzene residue linked with the —NH— group through a —CO— or —SO$_2$— group; one $Z_1$ represents a hydrogen atom and the other $Z_1$ a sulphonic acid group, and $X'_2$, $X'_3$ and $R''_3$ have the meanings defined above.

Advantageous results have been obtained in the first place with dyes of the formula (5) 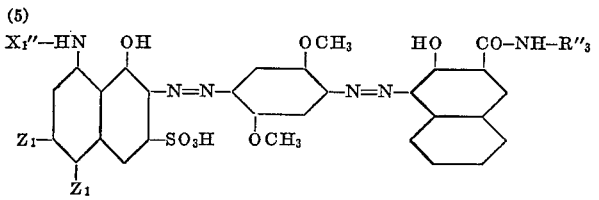

and especially with those of the formula (6) 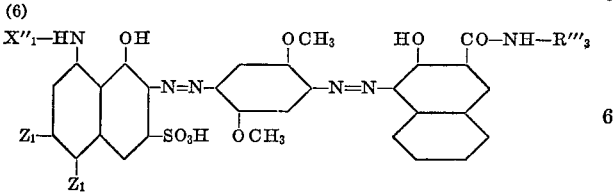

in which formulae $X''_1$, $Z_1$ and $R''_3$ have the above meanings and $R'''_1$ represents a residue of the formulae

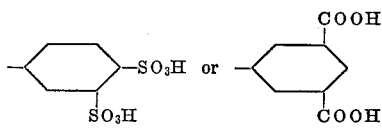

Preferred disazo dyes of the Formula 5 correspond to the formula (7) 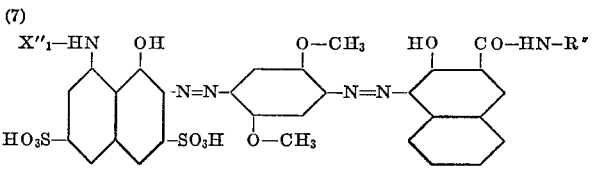

in which $X''_1$ and $R''_3$ have the meanings defined above.

The benzene residues $X''_1$ may contain further substituents, for example alkyl groups for example ethyl or methyl groups, halogen atoms for example chlorine or bromine, trifluoromethyl and acylamino groups for example acetylamino groups.

The disazo dyes of the Formulae 1 to 7 can be manufactured by the usual methods, for example by coupling a diazo compound of an aminobenzene which contains in the para-position to the amino group a substituent convertible into an amino group (—NH$_2$), with a compound of the formula (I)   (II) 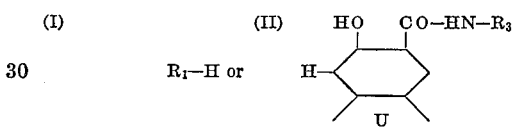

$R_1$—H or in the vicinal position to the hydroxy group, whereupon in the resulting monoazo dye the said substituent is converted into the amino group, the aminoazo dye is diazotized and the diazo compound is coupled with the other compound (I) or (II), also in vicinal position to the hydroxy group. In the above formulae $R_1$, $R_3$ and U have the meanings indicated.

Substituents convertible into the amino groups according to this process are, for example, acylamino groups for example acetylamino groups and more especially nitro groups. Accordingly, the following nitroaminobenzenes may be used, for example, as starting materials: 1-amino-2,5-dimethoxy-4-nitrobenzene, 1-amino-2,5-diethoxy-4-nitrobenzene, 1-amino-2-methoxy-4-nitro-5-ethoxybenzene, 1-amino-2-methyl-4-nitro-5-methoxybenzene, 1-amino-2,5-dichloro-4-nitrobenzene, 1-amino-2-chloro-3,6-dimethyl-4-nitrobenzene or 1-amino-2-acetylamino-4-nitro-5-methoxybenzene.

From a diazo compound of such as amine either the compound of the formula (8)  
     $R_1$—N=N—$R_2$—V or (9) 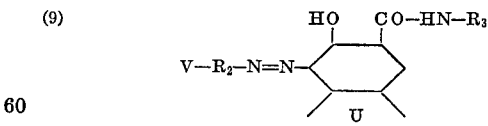

may be manufactured by coupling, and from it the aminomonoazo dyes of the formula

(10)  
      $R_1$—N=N—$R_2$—NH$_2$ or

(11) 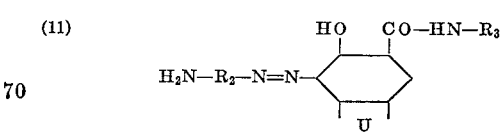

respectively. In these formulae $R_1$, $R_2$, $R_3$ and U have the above meanings and V represents a substituent convertible into an amino group, preferably a nitro group, which is then reduced in the nitromonoazo dye of the Formula 8 or 9 to the amino group. In general, of these two manufacturing methods the one is preferred in which the coupling with the hydroxynaphthalene sulphonic acid (I) is carried out first. In both these methods the coupling component may be, for example, one of the following compounds of the Formula I:

1,8-dihydroxynaphthalene-3,6-disulphonic acid,
1-hydroxy-8-methoxynaphthalene-3,6-disulphonic acid,
1-hydroxy-8-β-hydroxyethoxynaphthalene-3,6-disulphonic acid,
1-hydroxy-8-phenoxynaphthalene-3,6-disulphonic acid,
1-amino-8-hydroxynaphthalene-2,4-disulphonic acid,
1-amino-8-hydroxynaphthalene-3,6-disulphonic acid,
1-amino-8-hydroxynaphthalene-4,6-disulphonic acid,
1-benzoylamino-8-hydroxynaphthalene-3,6-disulphonic acid,
1-acetylamino-8-hydroxynaphthalene-3,6-disulphonic acid,
1-(3',4'-dichlorobenzoylamino)-8-hydroxy-naphthalene-3,6-disulphonic acid,
1-(4'-methylsulphonyl-aminobenzoylamino)-8-hydroxynaphthalene-3,6-disulphonic acid,
1-(4'-acetylaminobenzoylamino)-8-hydroxynaphthalene-3,6-disulphonic acid,
1-(3'-succinylaminobenzoylamino)-8-hydroxynaphthalene-3,6-disulphonic acid,
1-thienylamino-8-hydroxynaphthalene-3,6-disulphonic acid,
1-phenylsulphonylamino-8-hydroxynaphthalene-3,6-disulphonic acid,
1-(4'-methylphenylsulphonylamino)-8-hydroxynaphthalene-3,6-disulphonic acid,
1-benzoylamino-8-hydroxynaphthalene-4,6-disulphonic acid,
1-hexahydrobenzoylamino-8-hydroxynaphthalene-5-sulphonic acid,
1-(4'-methylphenylsulphonylamino)-8-hydroxynaphthalene-5-sulphonic acid.

The compounds of the Formula II, preferably used as the second coupling component, can also be manufactured by known methods by reacting an acid chloride of the formula (12)

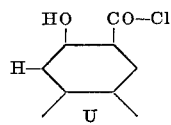

in which U has the above meaning, with a primary aromatic amine that contains at least one acidic group imparting solubility in water. This condensation is advantageously carried out in an inert organic solvent in the absence of water. The carboxylic acid chloride can be manufactured either before the condensation or in some cases simultaneously with it, that is to say when the reaction medium as such contains the aromatic amino acid, from the carboxylic acid and an acid halogenating agent for example phosphorus trichloride or thionyl chloride. As a rule it is advantageous to work in the presence of an acid acceptor, for example a pyridine base. The following compounds for example, may be used as aromatic amino acids: aminobenzene carboxylic acids for example 1-aminobenzene-3- or -4-carboxylic acid or 1-aminobenzene-3,5-dicarboxylic acid; aminonaphthalene carboxylic acids for example 1-aminonaphthalene-4- or -5-carboxylic acid, 2-aminonaphthalene-6-carboxylic acid or 1-aminonaphthalene-4,5-dicarboxylic acid; aminobenzene sulphonic acids for example 1-aminobenzene-3- or -4-sulphonic acid, 1-amino-4-methoxybenzene-3-sulphonic acid, 1-amino-2-methyl-3-chlorobenzene-5-sulphonic acid, 1-amino-2-methoxy-4-nitrobenzene-3-sulphonic acid, 4-aminodiphenyl ether-2-sulphonic acid, 4 - amino - diphenylthio ether-2-sulphonic acid or 1-aminobenzene-3,4- or -3,5-disulphonic acid; aminonaphthalene sulphonic acids for example 1-aminonaphthalene-4-, -5- or -7-sulphonic acid, 2-aminonaphthalene-5-, -6- or -7-sulphonic acid, 1-aminonaphthalene-4,8-disulphonic acid, 2-aminonaphthalene-4,8-disulphonic acid or 4-aminophenyl-(1)-naphthyl-(2')-thio ether-2-sulphonic acid.

The dyes of the Formulae 1 to 7 are specially suitable for use as cyan dyes in the silver dye bleaching process. Advantageously, they are built into a red-sensitive emulsion layer, but they can also be built into an auxiliary layer or into a layer immediately vicinal to the emulsion layer, that is to say also into a layer that is free from silver halide. They can be used for the production of positive or negative images. They are distinguished by advantageous spectral properties, especially by their very low absorption in the blue and green spectral regions; for example, when they are combined with suitable yellow and magenta dyes they can be used for grey shades that appear neutral to the eye over the whole density range. The dyes are readily soluble in water but in spite of this they do not diffuse into colourless underlayers or into supernatant emulsion or other gelatine layers, not even in treatment or processing baths having a wide pH-value range, for example from 0 to 11. The dyes are also very stable towards cations, and no precipitation or turbidity occurs especially with calcium ions. Accordingly, even after drying or processing the layers no opalescent or dull colours appear. Moreover, they hardly reduce the sensitivity of a silver bromide emulsion sensitized to red light. Their fastness to light is good. Furthermore, they can be bleached in the usual manner in acid dye bleaching baths.

In the following manufacturing instructions and examples percentages are by weight. The absorption maxima were measured in gelatine.

MANUFACTURING INSTRUCTIONS

(A)

Manufacture of 2-hydroxy-3-naphthoic acid phenylamide-3'-sulphonic acid 9.4 grams of 2-hydroxy-3-naphthoic acid and 8.65 g. of aniline-3-sulphonic acid are stirred with 50 ml. of orthodichlorobenzene and then 7.5 ml. of pyridine are added. The batch is heated to 70° C. and 3 g. of phosphorus trichloride are added dropwise within 30 minutes. The mixture is stirred for 3 hours while heating to 100 to 110° C.; then the agitator is switched off and the whole allowed to cool to room temperature. The dichlorobenzene is then decanted from the smeary mass, the residue is taken up in a solution of 3 g. of sodium carbonate in 50 ml. of water and steam-distilled. When all the chlorobenzene and pyridine have been expelled, a clear yellow solution is obtained which is acidified with formic acid. The batch is kept overnight, the precipitated crystals are suction filtered, washed with 50 ml. of cold water and dried at 60° C. under vacuum, to yield about 11.5 g. of 2-hydroxy-3-naphthoic acid phenylamide-3'-sulphonic acid.

Manufacture of the dye of the formula (21)

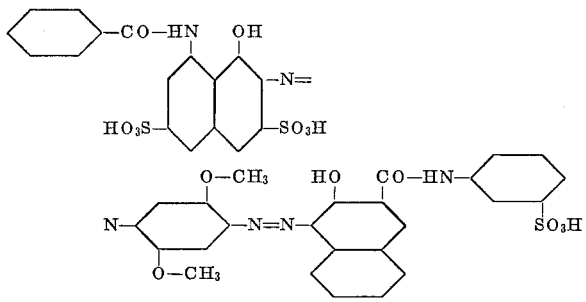

1 gram of 1-benzoylamino-8-hydroxynaphthalene-7-azo-3',5'-dimethoxy-4' - aminobenzene - 3,6-disulphonic acid prepared in the known manner [one process for the manufacture of an aminomonoazo dye of the Formula I $R_1$—H is given in Example 6; the aminomonoazo dye of the present Example 1 and those of the following examples can be manufactured by the methods described therein] is dissolved in 70 ml. of water, mixed with 20.6 ml. of naphthalene sulphonic acid solution [100 ml. contain per litre 0.1 mol of naphthalene-1-sulphonic acid and sulphuric acid each, total 0.3 mol of equivalent acid], cooled to 6° C. and 2.4 ml. of 4 N sodium nitrite solution are added. The whole is stirred for 1 hour at 4° C. and the diazo solution is added at 6° C. to a solution of 0.65 g. of 2-hydroxy-3-napthoic acid phenylamide-3'-sulphonic acid in 4 ml. of pyridine, 1 ml. of 27% ammonia and 20 ml. of water. During the addition of the diazo solution the pH-value is kept at 10 by adding ammonia solution. The batch is stirred for 1 hour at room temperature, heated within 1 hour to 90° C., 50 ml. of 25% sodium chloride solution are added and the whole is cooled to room temperature. The precipitated dye is suction filtered and washed with 10% sodium chloride solution until the washings run colourless. The dye is then dissolved in 3 ml. of water, filtered and precipitated with 10 ml. of ethanol, suction filtered and washed with 20 ml. of 80% ethanol. Yield: 0.4 g. Absorption maximum: 596 nm.

(B)

Manufacture of 2-hydroxy-3-naphthoic acid-4'-chlorophenylamide-3'-sulphonic acid (as described under (A) above)

Manufacture of the dye of the formula (22)

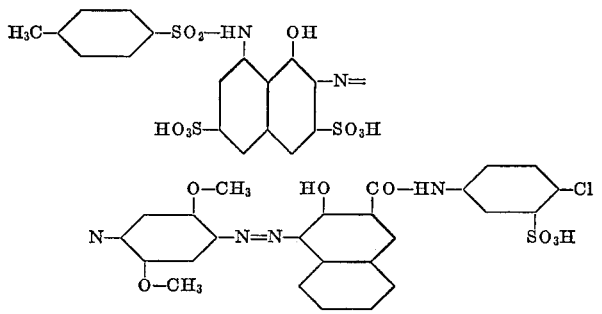

1.65 g. of toluenesulphonylamino - 8 - hydroxynaphthalene-7 - azo - 3',5' - dimethoxy-4'-aminobenzene-3,6-disulphonic acid (61%), manufactured in known manner, are dissolved in 56 ml. of water, and 20.6 ml. of naphthalene sulphonic acid solution (as in Example 1) are added, the whole is cooled to 6° C. and 3.5 ml. of 4 N sodium nitrite solution are added. The whole is stirred for 1 hour at 2 to 4° C. This diazo solution is added to a solution of 0.7 g. of 2-hydroxy-3-naphthoic acid - 4' - chlorophenylamide - 3' - sulphonic acid, dissolved in 4 ml. of pyridine, 1 ml. of 27% ammonia solution and 10 ml. of water at 5° C.; during the addition the pH-value is kept at 10 by adding ammonia solution. The whole is stirred for 1 hour at room temperature and then heated within 1 hour to 60 to 70° C. Then 10 g. of sodium chloride are added and the whole is cooled to room temperature, suction filtered, and washed with 15% sodium chloride solution until the washings run colourless. The dye is dissolved in 30 ml. of water, filtered and the filtrate is mixed with 6 g. of sodium chloride, suction filtered, and the residue is washed with 20 ml. of 10% sodium chloride solution. Yield: 0.5 g. of dye. Absorption maximum: 655 mm.

(C)

Manufacture of 2-hydroxyanthracene-3-carboxylic acid phenylamide-3',5'-dicarboxylic acid A suspension of 17.8 g. of 2 - hydroxyanthracene-3-carboxylic acid in 150 ml. of benzene is mixed with 12 g. of thionyl chloride and 11 g. of dimethylformamide. By heating the mixture for 10 minutes at 40° C. a brown solution of the acid chloride is obtained. The resulting acid chloride solution is stirred dropwise at 100° C. into a solution of 20.9 g. of 1-aminobenzene-3,5-dicarboxylic acid dimethyl ester in 80 ml. of pyridine so that the benzene distils over. When all has been added, the batch is stirred for 15 minutes, the reaction solution allowed to cool to room temperature and stirred into ½ litre of ether, stirred for 1 hour and the ether is decanted. The smeary residue is boiled with 100 ml. of methanol, suction filtered while still hot and washed with 50 ml. of methanol. The suction filter cake is thoroughly pressed, dissolved in 50 ml. of pyridine and mixed at 80° C. with 30 ml. of 10 N sodium hydroxide solution and 50 ml. of water, boiled and at the boil mixed with 400 ml. of water. A clear solution is obtained which is cooled to 20° C. and rendered acid to Congo red with hydrochloric acid. The batch is suction filtered, washed with 400 ml. of water and dried at 60° C. under vacuum. The dry material is finely powdered and boiled three times with 50 ml. of acetone each time. Yield: 9.3 g. of 2-hydroxyanthracene-3-carboxylic acid phenylamide-3',5'-dicarboxylic acid in the form of a yellow powder.

Manufacture of the dye of the formula (23)

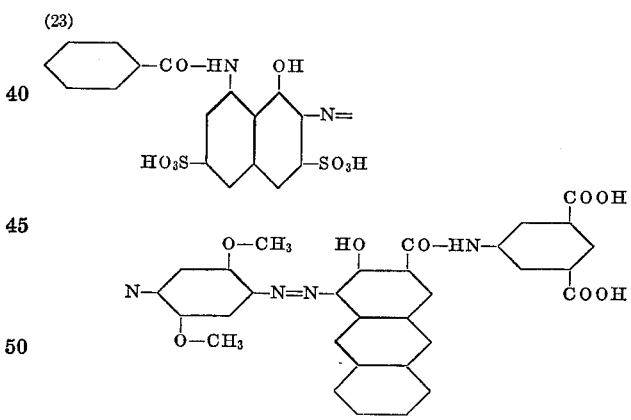

1 gram of 1-benzoylamino-8-hydroxynaphthalene - 7-azo-3',5'-dimethoxy - 4' - aminobenzene-3,6-disulphonic acid is diazotized as described under (A) above and coupled with 0.7 g. of 2-hydroxyanthracene-3-carboxylic acid phenylamide - 3',5' - dicarboxylic acid. Yield: 0.3 g. of dye. Absorption maximum: 630 mm.

(D)

Manufacture of 2-hydroxy-3-naphthoic acid naphthylamide-(1')-4'-sulphonic acid

A solution of 22.3 g. of aminonaphthalene-4-sulphonic acid in 100 ml. of N-methylpyrrolidone is mixed at 160° C. with a solution of 31 g. of 2-hydroxy-3-naphthoic acid chloride in 200 ml. of benzene so that the benzene distils over. When all has been added, the reaction mixture is stirred into 100 ml. of ether and the ether above the brown mass is decanted. The residue is boiled with 500 ml. of N-hydrochloric acid, suction filtered while still hot, and the residue is washed with water and dried. The dry material is ground and boiled with 100 ml. of ethanol three times. Yield: 19 g. of a light-yellow powder.

Manufacture of the dye of the formula (24)

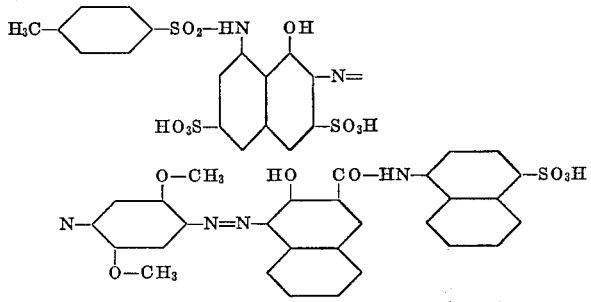

A solution of 1.3 g. of 1-toluenesulphonylamino-8-hydroxynaphthalene-7-azo-3',5'-dimethoxy - 4' - aminobenzene-3,6-disulphonic acid in 50 ml. of water is mixed with 15 ml. of naphthalene sulphonic acid solution and cooled to 6° C. Then 2.5 ml. of 4 N sodium nitrite solution are added and the whole is stirred for half an hour at 2 to 4° C.; any excess of nitrous acid is removed with sulphamic acid.

A solution of 0.95 g. of 2-hydroxy-3-naphthoic acid-naphthyl-(1')-amide-4'-sulphonic acid in 4 ml. of pyridine, 1 ml. of 27% ammonia solution and 10 ml. of water is cooled to 5° C. The above diazo solution is then stirred in and as much ammonia solution is added as is needed to keep the pH-value constant at 10. The batch is stirred for 1 hour at room temperature, heated to 70° C. within half an hour, mixed with 25 g. of sodium chloride and cooled. The precipitated dye is suction filtered, washed with 15% sodium chloride solution until the washings run colourless. The residue is dissolved in 3 ml. of water and the dye precipitated therefrom with 30 ml. of ethanol, suction filtered and washed with 30 ml. of 80% ethanol. Yield: 0.3 g. of dye. Absorption maximum: 682 nm.

(E)

Manufacture of 2-hydroxy-3-naphthoic acid phenylamide 3',5'-dicarboxylic acid

A suspension of 37.6 g. of 2-hydroxy-3-naphthoic acid in 150 ml. of benzene is mixed with 28 g. of thionyl chloride and 15 g. of dimethylformamide and the whole is refluxed for 30 minutes. This acid chloride solution is stirred at 100° C. into a solution of 20.9 g. of 1-aminobenzene-3,5-dicarboxylic acid dimethyl ester in 80 ml. of pyridine at the rate at which benzene distils over. The reaction mixture is then stirred into 500 ml. of ether, the ether above the resinous residue is decanted and the residue is washed twice with 100 ml. of ether. The residue is dissolved in 80 ml. of acetone, mixed with 50 ml. of 37% hydrochloric acid after the addition of 500 ml. of water, suction filtered and washed with water. Without drying, the filter residue is boiled with 100 ml. of methanol, suction filtered and washed with methanol. The residue is dissolved in 80 ml. of pyridine and mixed at 100° C. with 30 ml. of 10 N sodium hydroxide solution and 50 ml. of water. The batch is heated to 90° C. and 500 ml. of water are added. The resulting clear solution is rendered acid to Congo red with hydrochloric acid. The precipitate formed is suction filtered and the filter cake is washed three times with 150 ml. of water, dried at 60° C., powdered and boiled three times with 100 ml. of methanol. Yield: 17 g. of a yellow powder.

Manufacture of the dye of the formula (25)

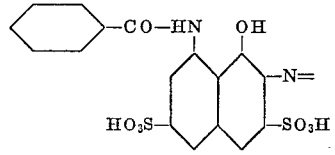

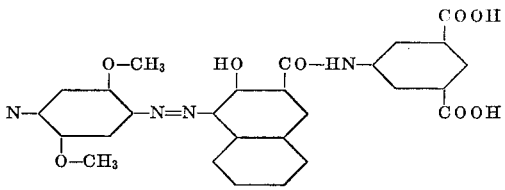

1 gram of 1 - benzoylamino-8-hydroxynaphthalene-7-azobenzene - 3',5' - dimethoxy - 4' - aminobenzene - 3,6-disulphonic acid is diazotized as described in Example 1 and coupled with 2-hydroxy-3-naphthoic acid phenylamide-3',5'-dicarboxylic acid. Yield: 0.4 g. of dye. Absorption maximum: 595 nm.

(F)

Manufacture of 1-phenylsulphamino-8-hydroxynaphthalene - 7 - azo - 3',5' - dimethoxy - 4' - aminobenzene-3,6-disulphonic acid 99 grams of 2,5-dimethoxy-4-nitroaniline are diazotized in known manner. 505 grams of 47.5% 1-phenylsulphamino-8-hydroxynaphthalene-3,6-disulphonic acid are dissolved in 2500 ml. of water at 60° C. The pH-value is adjusted to 7 to 7.2 with about 55 ml. of 30% sodium hydroxide solution. While stirring, 250 g. of sodium tetraborate are added; when it has dissolved the pH-value is adjusted to 10.2 with about 35 ml. of 30% sodium hydroxide solution and the whole is cooled to 5 to 6° C. The diazo solution is then added within 1 hour keeping the pH-value constant at 10.2 by adding 30% sodium hydroxide solution. During this the temperature remains constant at 5 to 6° C. When the diazo solution has been added, the batch is stirred for 30 minutes, and 1125 ml. of molar sodium sulphide solution are added to the suspension of this azo dye. The pH-value rises to 13. The batch is then heated to 40° C. and this temperature is maintained for 3 hours, during which the pH-value drops to 10.5. The progress of the reduction is controlled by thin-layer chromatography; it is complete when the thin-layer chromatogram displays a blue spot but no longer a red one. Then 450 g. of sodium hydrogen carbonate are added. The pH-value drops to 8.9 to 9. The batch is heated to 55° C. and while stirring well, 1500 g. of sodium chloride are added and the batch is maintained for 30 minutes at 55° C., cooled to 10° C., suction filtered and washed with 1 litre of 20% sodium chloride solution, dried at 60° C. under vacuum. Yield: 152 g. of crude product. This crude product is dissolved in 3 litres of water at 90° C. The undissolved sulphur is filtered, the filtrate mixed with 900 g. of sodium chloride and allowed to cool to 20° C., suction filtered and washed with 3 litres of 25% sodium chloride solution. Yield: 100 g. of dye. Absorption maximum: 592 nm.

Manufacture of 2-hydroxy-3-naphthoic acid phenylamide-3',5'-dicarboxylic acid according to Instruction (E)

Manufacture of the dye of the formula (26)

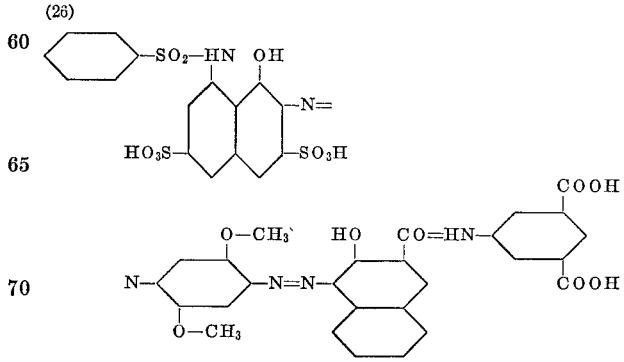

1 - phenylsulphamino - 8 - hydroxynaphthalene - 7-azo-3',5'-dimethoxy-4'-aminobenzene-3,6-disulphonic acid is diazotized and coupled with 2-hydroxy-3-naphthoic acid phenylamide-3′,5′-dicarboxylic acid according to Instruction (B). Absorption maximum: 650 nm.

(G)

Manufacture of 2-hydroxy-3-naphthoic acid-2′-methoxyphenylamide-5′-sulphonic acid A suspension of 37.6 g. of 2-hydroxy-3-naphthoic acid in 150 ml. of benzene is mixed with 28 g. of thionyl chloride and 15 g. of dimethylformamide and the mixture is refluxed for 30 minutes. This acid chloride solution is then dropped at 100° C. into a solution of 31.5 g. of 1-amino-2-methoxybenzene-5-sulphonic acid in 150 ml. of pyridine so that the benzene distills over. The resulting solution is stirred into 500 ml. of ether, the ether decanted from the precipitate and the latter once more washed with 100 ml. of ether. The residue is dissolved in 80 ml. of pyridine and mixed at 80° C. with 40 ml. of 10 N sodium hydroxide solution and 50 ml. of water. The whole is heated to the boil and 500 ml. of water are slowly added. The resulting clear solution is rendered acid to Congo red with hydrochloric acid, cooled to room temperature, suction filtered, the residue washed with water and dried at 80° C. under vacuum. The dry material is powdered and boiled with 80 ml. of methanol, cooled to 5° C., suction filtered, and the residue washed with methanol and ether. Yield: 21 g. of a white powder.

Manufacture of the dye of the formula

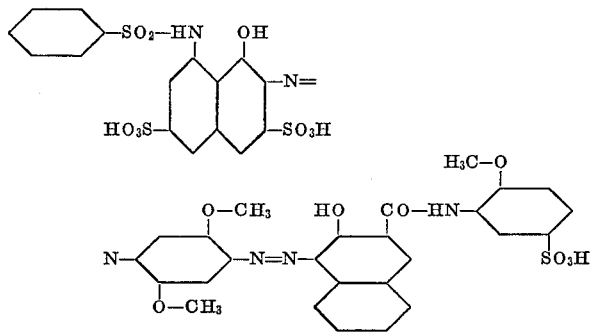

(27)

1 gram of 1-phenylsulphonylamino-8-hydroxynaphthalene - 7 - azo - 3′,5′-dimethoxy-4′-aminobenzene-3,6-disulphonic acid is diazotized and coupled with 0.7 g. of 2-hydroxy-3-naphthoic acid-2′-methoxy-phenylamide-5′-sulphonic acid as described in Example 1, to yield 0.4 g. of dye. Absorption maximum: 678 nm.

(H)

Manufacture of 2-hydroxy-3-napthoic acid-2′-methyl-3′-chlorophenylamide-5′-sulphonic acid 37.6 grams of 2-hydroxy-3-naphthoic acid are converted into the chloride as described under (G) above, and this acid chloride solution is dropped at 100° C. into a solution of 33.3 g. of 1-amino-2-methyl-3-chlorobenzene-5-sulphonic acid in 150 ml. of pyridine at the same rate as the benzene distills over. The resulting solution is stirred into 500 ml. of ether and the ether is decanted from the resinous precipitate. The resin is, dissolved at 80° C. in 120 ml. of pyridine, the solution is mixed at this temperature with 80 ml. of 10 N sodium hydroxide solution and heated to the boil; then 500 ml. of water are slowly added. When all water has been added, a little undissolved matter is suction filtered, the filtrate is cooled to room temperature and rendered acid to Congo red with hydrochloric acid. The batch is suction filtered, rinsed three times with 300 ml. of water and dried at 80° C. under vacuum.

Manufacture of the dye of the formula

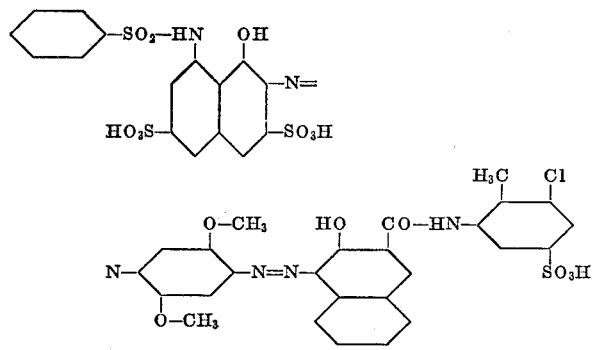

(28)

as described under (G) above. Absorption maximum: 662 nm.

(I)

Manufacture of 2-hydroxy-3-naphthoic acid-naphthyl-(1′)-amide-7′-sulphonic acid

The 2-hydroxy-3-naphthoic acid chloride solution prepared as described under (G) is stirred dropwise into 22 g. of 1-aminonaphthalene-7-sulphonic acid suspended in 150 ml. of pyridine at 100° C. at the rate at which benzene distills over. Then pyridine is distilled off until in all 210 ml. has passed over. The residue is diluted with 250 ml. of methanol and stirred into 500 ml. of ether. The ether above the resinous residue is decanted and the residue once more stirred with 100 ml. of ether. The ether is again decanted and the residue stirred with 400 ml. of ethanol for half an hour at the boil, then cooled to room temperature, suction filtered, and the residue washed three times with 100 ml. of ethanol. The moist residue is dissolved in 100 ml. of pyridine and at 100° C. mixed with 40 ml. of 10 N sodium hydroxide solution; then 400 ml. of water are slowly added. The resulting clear solution is cooled at 10° C. and rendered acid to Congo red with hydrochloric acid. The product is suction filtered, washed twice with 100 ml. of water and dried at 60° C. under vacuum.

Manufacture of the dye of the formula

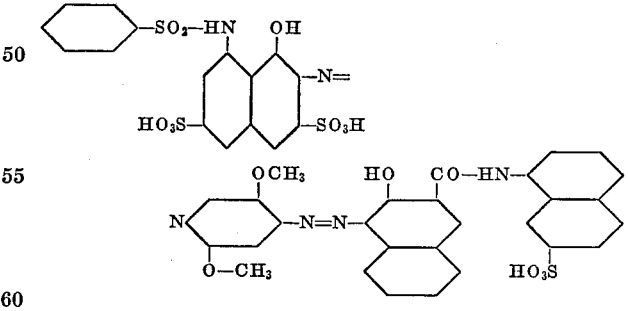

(29)

1 gram of 1-phenylsulphonylamino-8-hydroxynaphthalene - 7 - azo - 3′,5′-dimethoxy-4′-aminobenzene-3,6-disulphonic acid is diazotized as described under (A) above and then coupled with 0.71 g. of 2-hydroxy-3-naphthoic acid-naphtyl-(1′)-amide-7′-sulphonic acid, to yield 0.32 g. of dye. Absorption maximum: 665 nm.

(J)

Manufacture of 2-hydroxy-3-napthoic acid-naphthyl-(2′)-amide-5′-sulphonic acid 37.6 grams of 2-hydroxy-3-naphthoic acid are converted into the chloride as described under (E) above, and this acid chloride solution is stirred dropwise at 100° C. into a suspension of 25 g. of 2-aminonaphthalene-5- sulphonic acid in 150 ml. of pyridine at the same rate as benzene distils over. The batch is then further heated until a total of 210 ml. has passed over. The reaction mixture is diluted with 50 ml. of methanol, stirred into 500 ml. of ether, the ether is decanted and the residue dissolved in pyridine at 80° C. The batch is mixed with 50 ml. of 10 N sodium hydroxide solution and 400 ml. of water are added at 80° C. A small quantity of undissolved matter is filtered, and the filtrate is cooled to 2° C., mixed with 200 g. of ice and rendered acid to Congo red with hydrochloric acid. The precipitate is suction filtered, washed with 500 ml. of water and thoroughly pressed. Without drying, the filter cake is suspended in 100 ml. of methanol, heated to 60° C., then cooled to 20° C., suction filtered, and washed with 500 ml. of methanol. Without drying, the residue is suspended in 50 ml. of methanol and 30 ml. of 10 N sodium hydroxide solution are added, the whole is heated to the boil and 200 ml. of water are added. The resulting clear solution is cooled to 20° C. and 100 g. of Dry Ice ($CO_2$) are added, whereupon 2-hydroxy-3-naphthoic acid-(2′)-amide-5′-sulphonic acid settles out; it is suction filtered, washed twice with 20 ml. of water and dried at 60° C. under vacuum.

Manufacture of the dye of the formula (30)

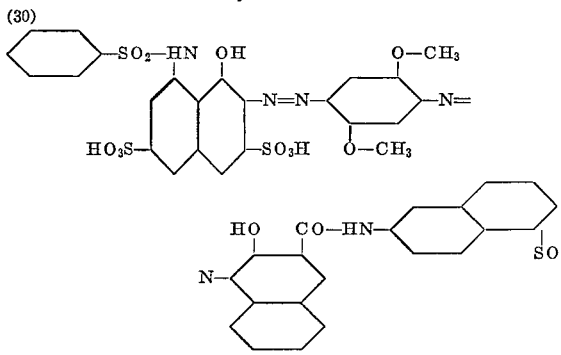

as described under (I) above. Yield: 0.2 g. of dye. Absorption maximum: 662 nm.

(K)

Manufacture of 2-hydroxy-3-naphthoic acid-4′-phenoxyphenylamide-3′-sulphonic acid as described under (J) above Manufacture of the dye of the formula (31)

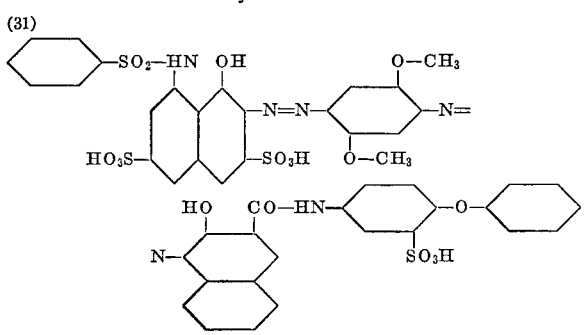

as described under (I) above. Absorption maximum: 665 nm.

(L)

Manufacture of 2-hydroxy - 3 - naphthoic acid-4′-phenylmercaptophenylamide-3′-sulphonic acid as described under (J) above Manufacture of the dye of the formula (32)

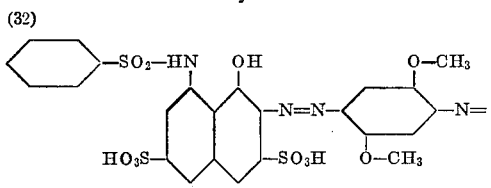

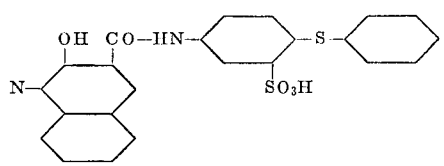

as described under (I) above. Absorption maximum: 656 nm.

(M)

Manufacture of 2-hydroxy-3-naphthoic acid-4′-naphthyl-(2″)-mercaptophenylamide-3′-sulphonic acid as described under (J) above Manufacture of the dye of the formula (33)

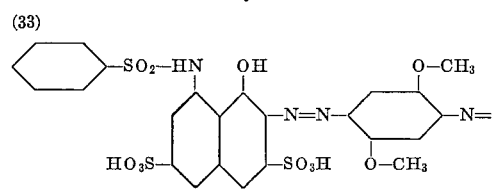

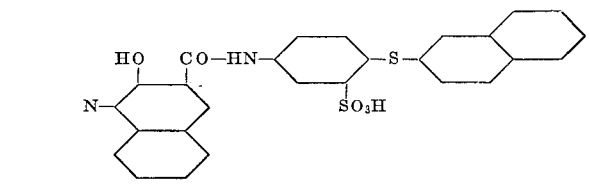

as described under (I) above. Absorption maximum: 688 nm.

(N)

Manufacture of 2-hydroxy - 3 - naphthoic acid-4′-phenylmercaptophenylamide-3′-sulphonic acid as described under (J) above Manufacture of the dye of the formula (34)

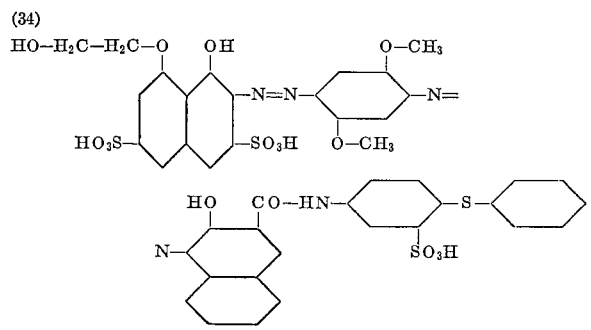

A solution of 0.2 g. of 1-β-hydroxyethoxy-8-hydroxynaphthalene - 7 - azo-3′,5′-dimethoxy - 4′ - aminobenzene-3,6-disulphonic acid in 10 ml. of water is mixed with 1 ml. of naphthalene sulphonic acid solution [prepared as described under (A) above], the whole is cooled to 4 to 5° C. and then 0.2 ml. of N sodium nitrate solution is added all at once.

0.4 gram of 2-hydroxy - 3 - naphthoic acid-4′-phenylmercaptophenylamide-3′-sulphonic acid are dissolved in 4 ml. of pyridine and 4 ml. of concentrated ammonia solution, mixed with 10 ml. of water, and ice is added until the temperature has dropped to 2 to 3° C. The diazo solution described above is then added all at once and the whole stirred for 18 hours at 5° C., heated for 1 hour at 80° C., 15 g. of sodium chloride are added, the batch is adjusted with dilute hydrochloric acid to a pH-value of 4, and then cooled to 20° C. The dye is suction filtered, and washed with 15 ml. of 25% and then with 10 ml. of 10% sodium chloride solution. The dye is dried under vacuum at 60° C. and then dissolved in 1 ml. of dimethylsulphoxide, the undissolved sodium chloride is filtered, and the filtrate is precipitated with 10 ml. of acetone and suction filtered. The residue is washed with 10 ml. of acetone and then with 30 ml. of a mixture of 1 part of benzene, 2 parts of isoamyl alcohol, 1 part of methanol, 1 part of dimethylformamide and 1 part of water. It is then washed with 10 ml. of ethanol and dried at 60° C. under vacuum. Yield: 0.2 g. of dye. Absorption maximum: 590 nm.

(O)

Manufacture of 2-hydroxy-3-naphthoic acid-2'-methoxy-4'-nitro-phenylamide-5'-sulphonic acid A suspension of 37.6 g. of 2-hydroxy-3-naphthoic acid in 150 ml. of benzene is mixed with 28 g. of thionylchloride and 15 g. of dimethylformamide and refluxed for 30 minutes. This acid chloride solution is then added dropwise to a suspension of 30.2 g. of sodium 1-amino-4-nitro-6-methoxybenzene-3-sulphonate in 80 ml. of pyridine at the same rate as benzene distils over. The resulting solution is stirred into 30 ml. of ether, the ether decanted from the precipitate and the latter is once more washed with 100 ml. of ether. The residue is dissolved in 80 ml. of pyridine and mixed at 80° C. with 40 ml. of 10 N sodium hydroxide solution and 50 ml. of water. The whole is heated to the boil within 15 minutes and 500 ml. of water are slowly added, whereupon a clear solution forms which is rendered acid to Congo red with hydrochloric acid. The whole is cooled to room temperature and suction filtered, washed with water and dried at 80° C. under vacuum. The dry material is powdered and boiled with 80 ml. of methanol, cooled to 5° C., suction filtered, and the residue washed with a small quantity of methanol and ether. Yield: 16 g. of a faintly greenish powder.

Manufacture of the dye of the formula (35)

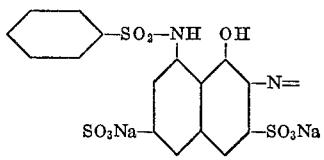

1 gram of 1-phenylsulphonylamino - 8 - hydroxynaphthalene-7-azo-3',5'-dimethoxy - 4' - aminobenezene-3,6-disulphonic acid is diazotized as described under (A) above and coupled with 0.7 g. of 2-hydroxy-3-naphthoic acid-2'-methoxy - 4' - nitro-phenylamide-5'-sulphonic acid, to yield 0.3 g. of dye of the Formula 35. Absorption maximum: 676 nm.

(P)

Manufacture of the dye of the formula (36)

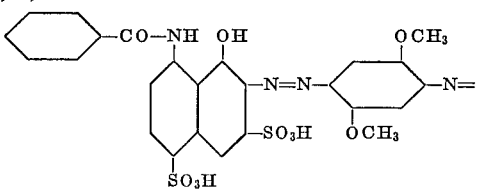

as described under (E) above. Absorption maximum: 598 nm.

A few more dyes, each with its absorption maximum, are listed below. These dyes can be manufactured in the same manner as described in the foregoing instructions.

(37)

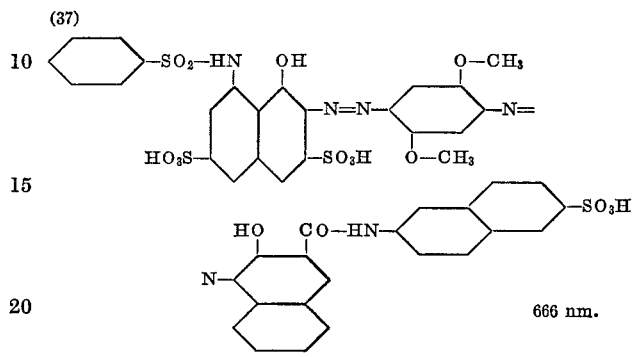

666 nm.

(38)

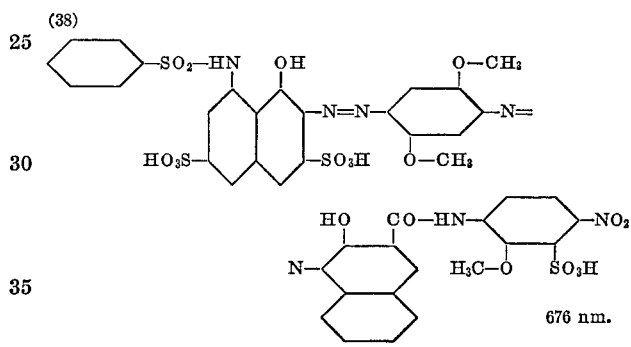

676 nm.

(39)

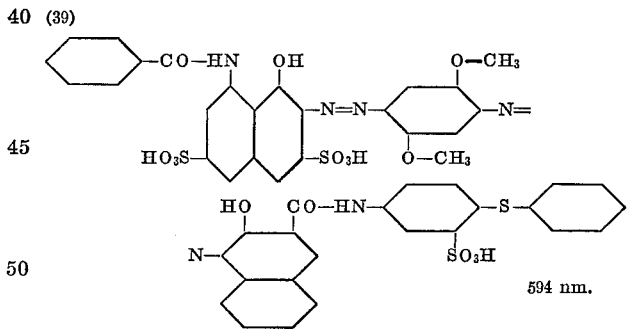

594 nm.

(40)

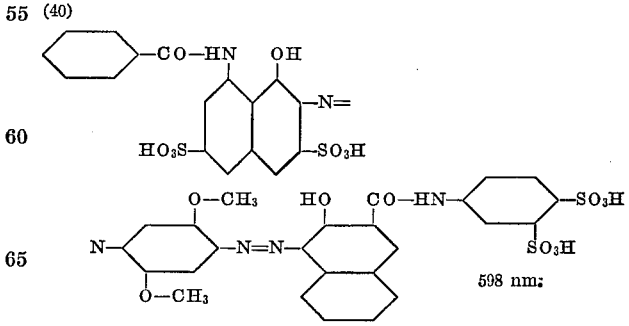

598 nm.

EXAMPLE 1

The following layers are produced on a white-opaque cellulose acetate film provided with an adhesive layer:

(1) A red-sensitive silver bromide emulsion in gelatine, which contains the cyan dye of the Formula 31.

17

(2) A colourless gelatine layer without silver halide.
(3) A green-sensitive silver bromide emulsion in gelatine, containing the magenta dye of the formula (41)

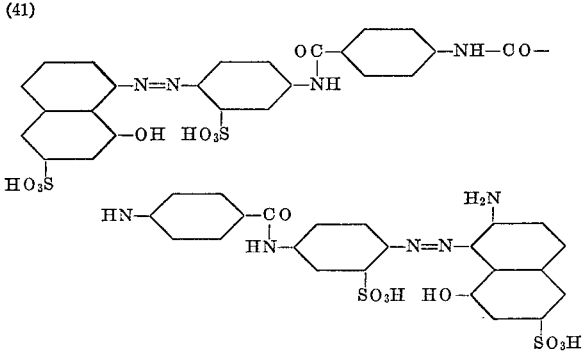

(4) A yellow filter layer containing the dye of the formula (42)

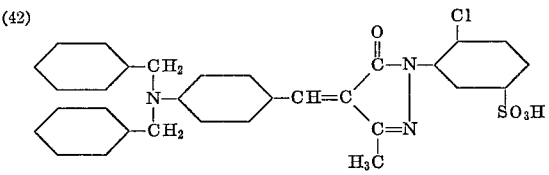

(5) A blue-sensitive bromide emulsion in gelatine which contains the yellow dye of the formula (43)

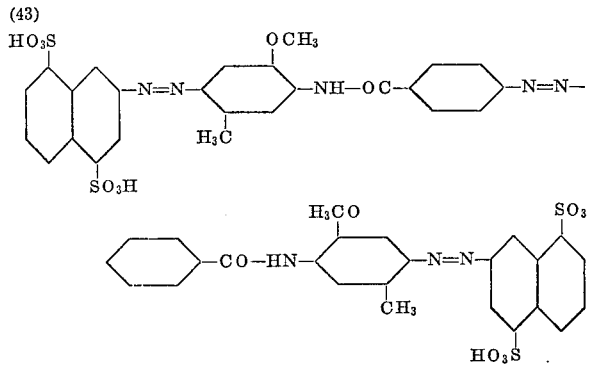

If desired, the gelatine layers may contain additives for example wetting agents, hardeners and stabilizers for the silver halide. In other respects the layers are produced so that the individual layer contains per square metre of film 0.5 g. of the dye indicated and an amount of silver bromide corresponding to 1 to 1.2 g. of silver.

The film coated as described above is exposed under a colour transparency with red, green and blue printing light. The print is then developed as follows:

(1) 6 minutes development in a bath containing per litre of water 50 g. of anhydrous sodium sulphite, 0.2 g. of 1-phenyl-3-pyrazolidone, 6 g. of hydroquinone, 35 g. of anhydrous sodium carbonate, 4 g. of potassium bromide and 0.3 g. of benztriazole;
(2) 5 minutes rinsing in water;
(3) 6 minutes fixing in a solution of 200 g. of sodium thiosulphate (crystalline) and 20 g. of potassium metabisulphite in 1 litre of water;
(4) 5 minutes rinsing in water;
(5) 3 to 12 minutes dye bleaching with a solution containing in 1 litre of water 50 to 80 g. of potassium bromide, 40 to 80 g. of thiourea, 35 to 80 g. of 30% sulphuric acid and, if desired, 0.001 to 0.01 g. of 2-amino-3-hydroxyphenazine;

18

(6) 10 minutes rinsing in water;
(7) bleaching the residual silver for 5 minutes with a solution of 60 g. of crystalline copper sulphate, 80 g. of potassium bromide and 15 ml. of 30% hydrochloric acid per litre of water;
(8) 5 minutes rinsing in water;
(9) 5 minutes fixing as indicated under (3) above;
(10) 5 minutes rinsing in water.

A positive, opaque colour print is obtained which is fast to light and suitable for document purposes.

EXAMPLE 2

A silver bromide emulsion layer is poured on to a 13 cm. x 18 cm. glass plate. After drying, a solution containing 3.3 ml. of 6% gelatine, 2 ml. of a 1% aqueous solution of 1,3-dichlorotriazine-5-aminobenzene - 4' - sulphonic acid, 4.2 ml. of water and 4.5 ml. of a 1% aqueous solution of the dyestuff of Formula 36 is poured on to the emulsion layer. After drying, a strip of the glass plate is exposed in a silver wedge at 500 Lux for three seconds and then treated in the following baths for the time stated:

(a) developer (10 minutes)
    p-methylaminophenol sulphite—1 g.
    anhydrous sodium sulphate—20 g.
    hydroquinone—4 g.
    anhydrous sodium carbonate—10 g.
    potassium bromide—2 g.
    made up with water to 1000 ml.
(b) washing for two minutes
(c) stopping bath (6 minutes)
    crystalline sodium thiosulphate—200 g.
    anhydrous sodium sulphite—15 g.
    sodium acetate ($3H_2O$)—25 g.
    glacial acetic acid—13 ml.
    made up with water to 1000 ml.
(d) washing for 8 minutes
(e) colour bleaching bath (20 minutes)
    potassium iodide—20 g.
    96% sulphuric acid—55 ml.
    water—1945 ml.
    an ethanol solution containing 0.3 g. of 2,3-dimethyl-6-aminoquinoxaline in 50 ml. of ethanol—30 ml.
(f) washing for 4 minutes
(g) silver bleaching bath (8 minutes)
    potassium ferricyanide—50 g.
    potassium bromide—15 g.
    disodium phosphate—10 g.
    monosodium phosphate—14 g.
    made up with water to 1000 ml.
(h) washing for 6 minutes
(i) fixing bath (6 minutes)
    same as stopping bath (c)
(j) washing for 10 minutes.

A positive blue colour print is obtained.

I claim:
1. A photographic light-sensitive silver halide material for the silver dye bleaching process which contains on a support at least one layer comprising at least one disazo dye of the formula

(3)

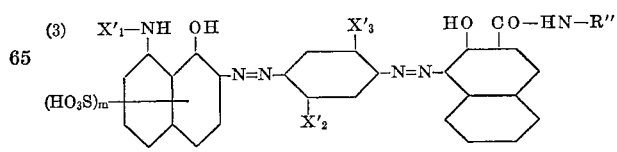

in which $X'_1$ represents the acyl radical of a member selected from the group consisting of an aliphatic, cycloaliphatic, aromatic and heterocyclic carboxylic acid and an aromatic sulfonic acid; $X'_2$ and $X'_3$ each represents an alkoxy group containing at most 2 carbon atoms; $R''_3$ represents an aromatic radical consisting of at most two 6-membered rings containing at least one sulfonic or carboxylic acid group, and m is an integer of at most 2.

2. A photographic material as claimed in claim 1, which contains at least one disazo dye of the formula (4)
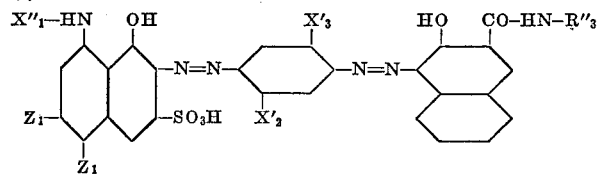

in which $X''_1$ represents a benzene radical linked with the —NH— group through a —SO$_2$— or —CO— group; one $Z_1$ represents a hydrogen atom and the other $Z_1$ a sulfonic acid group; $X'_2$ and $X'_3$ each represents an alkoxy group containing 1 or 2 carbon atoms, and $R''_3$ an aromatic radical which contains one or two 6-membered rings and contains at least one sulfonic or carboxylic acid group.

3. A photographic material as claimed in claim 1, which contains at least one disazo dye of the formula (5)
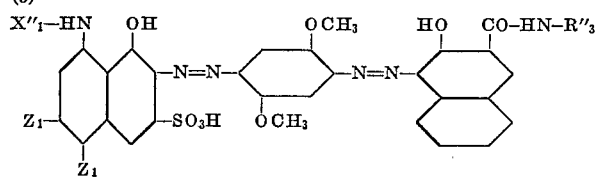

in which $X''_1$ represents a benzene radical which is linked with the —NH— group through a —CO— or —SO$_2$— group; one $Z_1$ represents a hydrogen atom and the other $Z_1$ a sulfonic acid group, and $R''_3$ represents an aromatic radical which contains at most two 6-membered rings and contains one or two sulfonic acid groups or two carboxylic acid groups.

4. A photographic material as claimed in claim 1, which contains at least one disazo dye of the formula (6)
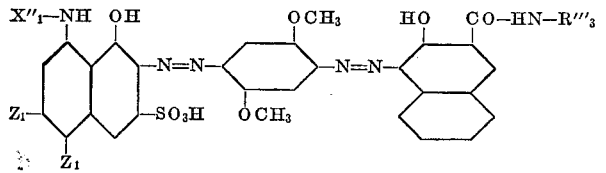

in which $X''_1$ represents a benzene radical which is linked with the —NH— group through a —CO— or —SO$_2$— group; one $Z_1$ represents a hydrogen atom and the other $Z_1$ a sulfonic acid group, and $R'''_3$ represents a member selected from the group consisting of a radical of the formulae

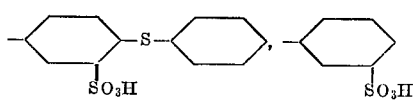

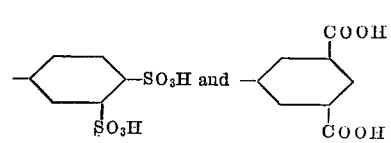

5. A photographic material as claimed in claim 1, which contains at least one disazo dye of the formula

(21)
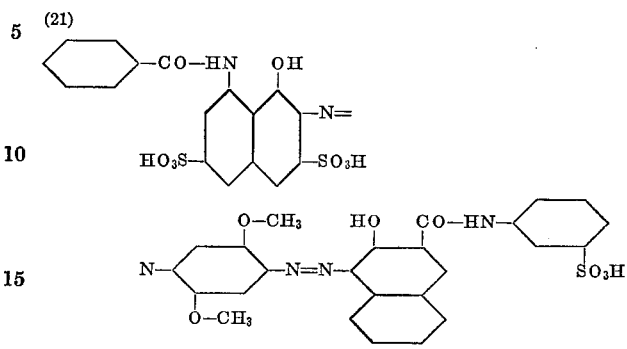

6. A photographic material as claimed in claim 1, which contains at least one disazo dye of the formula

(23)
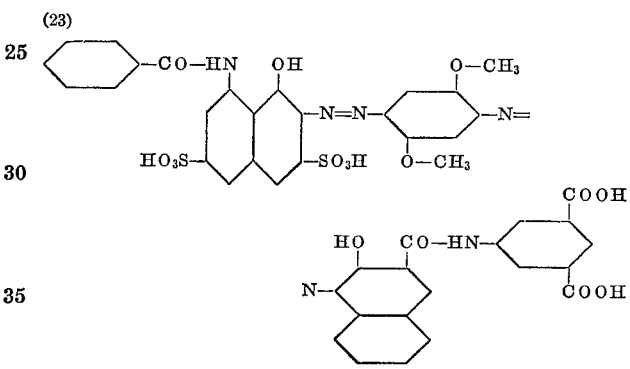

7. A photographic material as claimed in claim 1, which contains at least one disazo dye of the formula

(39)
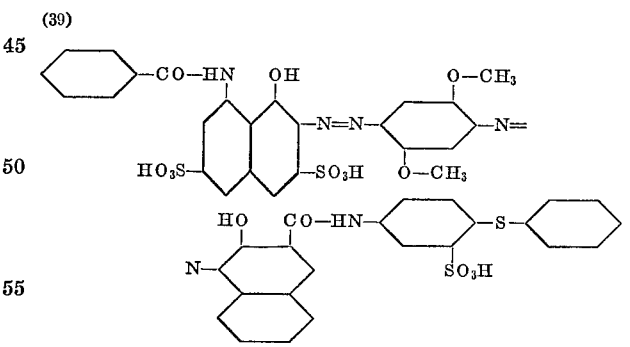

8. A photographic material as claimed in claim 1, which contains at least one disazo dye of the formula

(40)
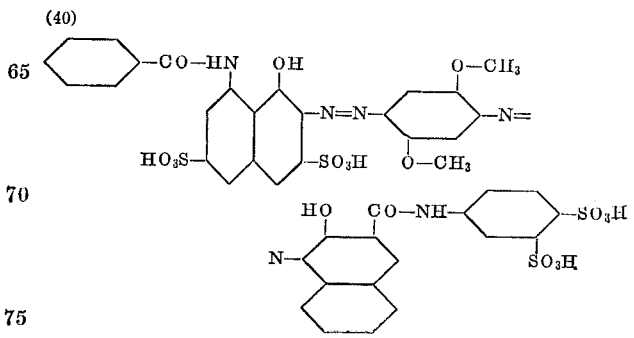

9. A photographic material as claimed in claim 1, which contains at least one disazo dye of the formula
(36)
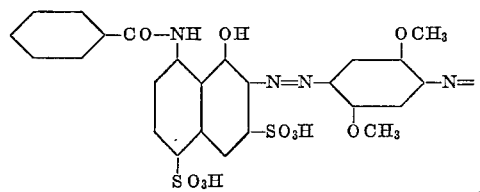
10. A photographic material as claimed in claim 1, which contains the disazo dye in a layer that is free from silver halide.
References Cited
UNITED STATES PATENTS
| | | | |
|---|---|---|---|
| 2,612,448 | 9/1952 | Gaspar et al. | 96—73 |
| 2,612,496 | 9/1952 | Gaspar et al. | 96—99 |
| 3,157,508 | 11/1964 | Dreyfuss | 96—73 |
| 3,304,181 | 2/1967 | Anderau | 96—99 |
J. TRAVIS BROWN, Primary Examiner
U.S. Cl. X.R.
96—99; 260—174